United States Patent

Hardie

[11] Patent Number: 5,810,409
[45] Date of Patent: Sep. 22, 1998

[54] MAGNETIC RETRIEVAL DEVICE

[76] Inventor: Richard J. Hardie, 84 Ford Rd. North, Denville, N.J. 07834

[21] Appl. No.: 799,899

[22] Filed: Feb. 13, 1997

Related U.S. Application Data

[63] Continuation-in-part of Ser. No. 450,784, May 5, 1995, abandoned.

[51] Int. Cl.$^6$ ..................................................... B25J 15/06
[52] U.S. Cl. ........................................................... 294/65.5
[58] Field of Search ................................. 294/19.1, 65.5, 294/100; 81/64, 125, 177.6; 335/285, 293, 294, 302, 303

[56] References Cited

U.S. PATENT DOCUMENTS

| | | | |
|---|---|---|---|
| 2,372,930 | 4/1945 | Bovee | 294/65.5 X |
| 2,390,339 | 12/1945 | Ullman et al. | 294/65.5 |
| 2,417,762 | 3/1947 | Koller | 294/65.5 |
| 2,683,618 | 7/1954 | Long | 294/65.5 |
| 2,732,243 | 1/1956 | Mount | 294/65.5 |
| 2,993,723 | 7/1961 | Twachtman et al. | 294/65.5 |
| 3,384,408 | 5/1968 | Furzey | 294/65.5 |
| 3,684,288 | 8/1972 | Grace | 297/65.5 X |
| 4,813,729 | 3/1989 | Speckhart | 294/65.5 |
| 5,169,193 | 12/1992 | Stelmach | 294/65.5 |
| 5,261,714 | 11/1993 | Slusar et al. | 294/65.5 |
| 5,265,887 | 11/1993 | Stelmach | 294/65.5 |

FOREIGN PATENT DOCUMENTS

| | | | |
|---|---|---|---|
| 2407796 | 7/1979 | France | 294/65.5 |
| 584156 | 1/1947 | United Kingdom | 294/65.5 |
| 639039 | 6/1950 | United Kingdom | 294/65.5 |

*Primary Examiner*—Johnny D. Cherry

[57] ABSTRACT

A magnet retrieval device having a tubular non-conducting body with two ends, each end having an end face. A permanent magnet is fixed in a first one of the ends of the tubular body so that the magnet does not project out from the tubular body. Furthermore, the magnet has an end face that is substantially flush with the end face of the first end of the tubular body.

11 Claims, 1 Drawing Sheet

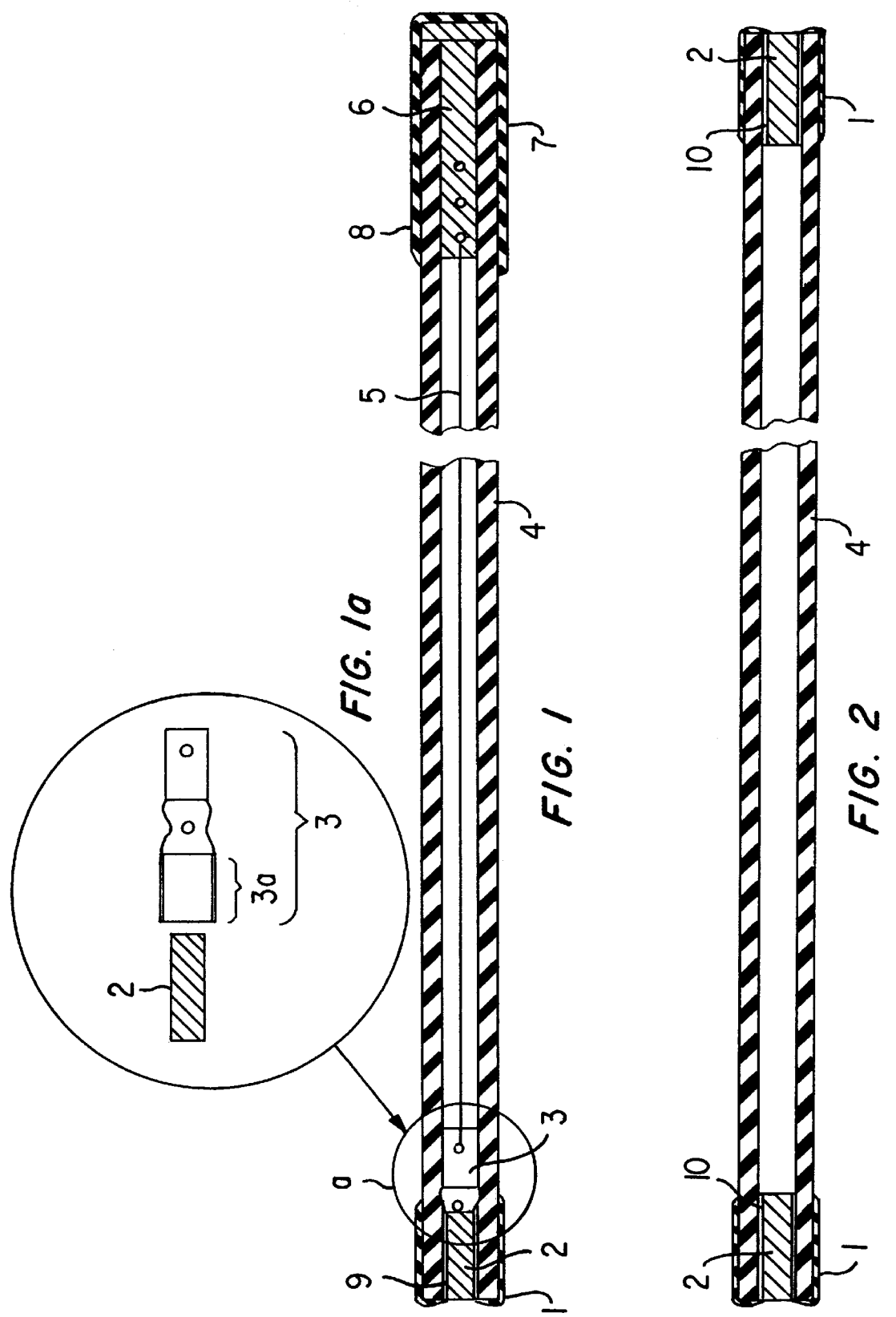

MAGNETIC RETRIEVAL DEVICE

This is a continuation-in-part of application Ser. No. 08/450,784, filed May 5, 1995, now abandoned.

BACKGROUND OF THE INVENTION

1. Field of the Invention

This invention pertains to the field of magnetic tools for retrieving magnetically attractive items, such as small bolts, screws, or tools from hard to reach places.

2. Description of the Prior Art

Prior art discloses that there are many magnetic devices on the market today which generally are rigid, conductive, spring in nature and impractical to use. These devices have cumbersome bodies which do not yield to erratic turns while searching in the blind for what is lost and not in immediate sight, for example as often occurs to mechanics working on automobile engines or other machinery.

SUMMARY OF THE INVENTION

Accordingly, it is an object of the present invention to provide a magnetic pickup tool that has a permanent magnet connected to a wholly non-conductive, highly flexible shaft. The inventive tool incorporates the magnet without the use of a rigid additional connecting piece, as in the prior art in its construction. The inventive design houses the magnet in the shaft directly without using a magnet attachment member. This type of fabrication increases the tool's efficiency and usability while decreasing economic liabilities. This design also reduces the size of the head end of the pick-up device and allows for a greater flexibility when retrieving a loose object. Additionally, this feature shields the attractive properties of the permanent magnet from any direction except the immediate vicinity of the tip of the pick-up tool. This assures that the tool is not attracted to undesired objects during its positioning.

BRIEF DESCRIPTION OF THE DRAWING

FIG. 1 is a cross-section of the magnetic retrieval device pursuant to the present invention;

FIG. 1a is an enlarged exploded view of a portion of the device of FIG. 1; and

FIG. 2 is a view similar to FIG. 1 of another embodiment of the invention.

DETAILED DESCRIPTION OF THE PREFERRED EMBODIMENT

The following features can be discerned from FIG. 1:

1. A plastic sheath 1 over the magnet end is used to seal the magnet/shaft interface.
2. A permanent cylindrical magnet 2 is attached to a spark plug wire clip 3 at the end of the body 4 of the device. The body 4 is formed of a flexible rubber hose having an inner diameter. The magnet 2 has an outer diameter that is substantially equal to the inner diameter of the hose.
3. The spark plug wire clip 3 provides the housing for the magnet 2 to insure its stability.
4. ¼" inside diameter rubber hose is a preferred size for the rubber hose body 4.
5. 16 gauge wire 5 connected in holes of a clevis pin 6 at one end of the body 4, extends and is connected to the spark plug clip 3 to prevent the magnet 2 from becoming disconnected from the body.
6. The clevis pin 6 with holes to retain the wire 5 in place has a ¼" outside diameter which, provides firm handle structure.
7. A plastic-dipped sheath 7 is provided at the end of the body 4 where the clevis pin 6 is located. This construction provides a handle which facilitates easy manipulation of the retrieval device.

As FIG. 1 shows, the body 4 has a first end at which the magnet 2 is mounted and a second end at which a handle 8 is provided. As previously stated, the plastic sheath 1 serves to seal any gap 9 (as shown in FIG. 1) between the magnet 2 and the inner wall of the body 4. Similar protection can be achieved by using a magnet that has a larger diameter than the inner diameter of the body. In this way, the rubber body 4 must be stretched to slip over the magnet 2. The resulting elastic forces in the body seal the interface between the magnet and the inner wall of the body.

As shown in FIG. 1a, the magnet 2 is held in the body 4 by a crimping clip, such as a spark plug wire clip. The clip 3 holds the magnet 2 by having a section 3a that is crimped around the magnet 2. The wire 5 can be made of metal or any other suitable material, such as plastic, which will help prevent the magnet 2 from becoming dislodged from the end of the body 4. When less security is required, it is possible to leave the wire out completely. In place of the clip it is possible to secure the magnet 2 in the body 4 with an adhesive 10, as shown in FIG. 2. Appropriate adhesives are known to those skilled in the art. It is also possible to fix the magnet in place by friction between the magnet surface and the inner wall of the body and the elastic return forces of the body acting on the magnet. This is accomplished by undersizing the body so that it must expand in order for the magnet to be inserted. In this way the elastic force of the body together with the friction between the inner wall of the body and the magnet surface holds the magnet in place.

In another embodiment of the present invention, shown in FIG. 2, both ends of the body 4 are provided with a magnet 2 therein. The magnets can be fixed in place in any of the above discussed ways. As previously indicated, the body 4 is made of a flexible non-metallic material, such as rubber or a polymer material. Tubing or a hose are preferred configurations of the body. The body should also be flexible and elastic so that it can negotiate tight corners.

The magnet 2 is arranged in the body so that no part of the magnet 2 projects out from the end of the body 4. This is necessary to prevent the magnet from being attracted to undesired items, such as the metal cylinder walls of an engine from which the user is trying to retrieve a screw. Preferably, the end face of the magnet is flush with the end face of the tubular body, as shown in FIG. 1.

The inventive device is a highly flexible, non-conductive tool that has a permanent magnet that can retrieve small items from tight places, or unwanted positions. It has no bulky head or non-bendable shank. It is pliable and can be extracted without getting hung-up and stuck due to stiff, spring like materials of construction, as was common with the prior art devices.

I claim:

1. A magnetic retrieval device, consisting essentially of: a single flexible, non-rigid tubular non-conductive body having two ends, each of the ends having an annular end face; and, a permanent magnet fixed in a first one of the ends of the tubular body so that the magnet does not project from the tubular body and an end face of the magnet is substantially flush with the end face of the first end of the tubular body.

2. A device as defined in claim 1, wherein the tubular body is made of rubber.

3. A device as defined in claim 1, wherein the tubular body has an inner diameter, the magnet having an outer diameter substantially equal to the inner diameter of the tubular body.

4. A device as defined in claim 1, and further comprising means for fixing the magnet within the tubular body.

5. A device as defined in claim 4, wherein the fixing means includes a clip mounted in the tubular body at a distance from the first end, the clip having a crimp section in which the magnet is crimped.

6. A device as defined in claim 5, and further comprising a clevis pin arranged within the tubular body at a second of the ends of the body, and a wire connected between the clevis pin and the clip.

7. A device as defined in claim 4, wherein the fixing means includes an adhesive for gluing the magnet in the tubular body.

8. A device as defined in claim 1, and further comprising a plastic sheath at each of the ends of the tubular body.

9. A device as defined in claim 1, and further comprising an additional permanent magnet fixed in a second of the ends of the tubular body.

10. A device as defined in claim 1, wherein the tubular body has an inner diameter, the magnet having an outer diameter greater than the inner diameter of the tubular body so that the magnet is held in place in the tubular body by frictional and elastic.

11. A device as defined in claim 1, wherein the tubular body is made of a polymeric material.

* * * * *